United States Patent
Shao et al.

(10) Patent No.: US 9,680,307 B2
(45) Date of Patent: Jun. 13, 2017

(54) SYSTEM AND METHOD FOR VOLTAGE REGULATION OF A RENEWABLE ENERGY PLANT

(71) Applicant: General Electric Company, Schenectady, NY (US)

(72) Inventors: Miaolei Shao, Altamont, NY (US); Jovan Bebic, Clifton Park, NY (US); Owen Jannis Samuel Schelenz, Schenectady, NY (US); Patrick Hammel Hart, Ballston Park, NY (US)

(73) Assignee: General Electric Company, Schenectady, NY (US)

( * ) Notice: Subject to any disclaimer, the term of this patent is extended or adjusted under 35 U.S.C. 154(b) by 846 days.

(21) Appl. No.: 13/724,305

(22) Filed: Dec. 21, 2012

(65) Prior Publication Data

US 2014/0175887 A1    Jun. 26, 2014

(51) Int. Cl.
*H02J 4/00* (2006.01)
*H02J 3/16* (2006.01)
*H02J 3/24* (2006.01)
*H02J 3/38* (2006.01)

(52) U.S. Cl.
CPC ........... *H02J 4/00* (2013.01); *H02J 3/16* (2013.01); *H02J 3/24* (2013.01); *H02J 3/383* (2013.01); *Y02E 10/563* (2013.01); *Y02E 40/34* (2013.01); *Y10T 307/658* (2015.04)

(58) Field of Classification Search
CPC ................. H02J 3/383; H02J 3/24; H02J 3/16
See application file for complete search history.

(56) References Cited

U.S. PATENT DOCUMENTS

| 5,216,696 A * | 6/1993 | Poklemba ............ H04B 1/1027 375/346 |
| 6,763,917 B2 * | 7/2004 | Utsunomiya ........... B66B 7/042 187/292 |
| 7,166,928 B2 * | 1/2007 | Larsen .................... F03D 9/005 290/44 |
| 7,318,154 B2 | 1/2008 | Tehee, Jr. |
| | | (Continued) |

OTHER PUBLICATIONS

PCT Search Report and Written Opinion issued Mar. 31, 2014 in connection with corresponding PCT Application No. PCT/US2013/071120.

*Primary Examiner* — Thienvu Tran
*Assistant Examiner* — Pinping Sun
(74) *Attorney, Agent, or Firm* — Dority & Manning, P.A.

(57) ABSTRACT

Systems and methods for regulating the voltage at a point of interconnection of a renewable energy plant, such as a solar plant, with a grid are provided. A voltage signal indicative of the voltage at the point of interconnection can be received and filtered with a high pass filter to generate a filtered error signal. The high pass filter can block components of the voltage signal at a frequency less than a threshold frequency. A reactive power command for the renewable energy plant can be generated based on the filtered error signal. One or more inverters of the renewable energy plant can be controlled to output reactive power based on the reactive power command. A rejection module can be implemented to prevent adverse interaction with other voltage control devices. In addition, a reset module can be implemented to preserve dynamic reactive power range of the inverters.

17 Claims, 7 Drawing Sheets

(56) References Cited

U.S. PATENT DOCUMENTS

| | | |
|---|---|---|
| 7,560,906 B2 | 7/2009 | Liu et al. |
| 7,603,399 B2 * | 10/2009 | Renger ................ H03K 5/1252 |
| | | 708/300 |
| 7,839,024 B2 | 11/2010 | Cardinal et al. |
| 7,890,217 B2 | 2/2011 | Cardinal et al. |
| 7,923,862 B2 | 4/2011 | Cardinal et al. |
| 7,990,743 B2 | 8/2011 | Walling et al. |
| 2005/0040655 A1 | 2/2005 | Wilkins et al. |
| 2009/0200994 A1 | 8/2009 | Fornage |
| 2010/0067271 A1 | 3/2010 | Garces et al. |
| 2010/0109447 A1 * | 5/2010 | Achilles ................ F03D 7/0284 |
| | | 307/153 |
| 2010/0138061 A1 | 6/2010 | Walling et al. |
| 2012/0043972 A1 * | 2/2012 | Jayaraman ............ G06F 3/0418 |
| | | 324/658 |
| 2012/0049636 A1 | 3/2012 | Galbraith et al. |
| 2012/0235498 A1 * | 9/2012 | Johnson .................. H02J 3/383 |
| | | 307/82 |
| 2012/0306277 A1 * | 12/2012 | Garcia .................... F03D 9/003 |
| | | 307/82 |

\* cited by examiner the renewable energy plant.

SYSTEM AND METHOD FOR VOLTAGE REGULATION OF A RENEWABLE ENERGY PLANT

FIELD OF THE INVENTION

The present disclosure relates generally to renewable energy sources and more particularly to regulating output of a renewable energy plant.

BACKGROUND OF THE INVENTION

Renewable energy sources, such as solar and wind farms, are becoming more economically viable as sources of energy. Renewable energy plants typically include a plurality of power converters configured to convert power generated by the renewable energy source(s) (e.g. photovoltaic arrays, wind turbines, etc.) to AC power suitable for a utility grid. For example, a typical solar farm will include a plurality of inverters configured to convert DC power generated by one or more photovoltaic arrays (PV arrays) to suitable AC power at a grid frequency for application to the utility grid. The plurality of inverters can be coupled to the grid through a transformer at a point of interconnection for the renewable energy plant.

Voltage regulation at the point of interconnection for a renewable energy plant, such as a solar farm, can be accomplished by regulating the reactive power output of the renewable energy plant. For instance, a control system can provide reactive power commands (Q commands) to each of the plurality of inverters in the renewable energy plant to control the reactive power output of the individual inverters to achieve a desired reactive power output at the point of interconnection for the renewable energy plant.

In grid transmission applications (e.g. high voltage transmission applications), reactive power output at the point of interconnection with the grid transmission system can have an influence on voltage at the point of interconnection. Because most transmission systems are inductive, increasing reactive power can typically cause the voltage at the point of interconnection to increase. Conversely, decreasing a reactive power output can typically cause the voltage at the point of interconnection to decrease.

Regulating voltage at the point of interconnection in grid distribution applications (e.g. medium voltage or less applications) can be more difficult. Because of the decreased X/R ratios (reactance/resistance ratios) associated with distribution systems, increased reactive power is required to regulate voltage at the point of interconnection with a distribution application when compared to transmission applications. As a result, a control system for the renewable energy plant can attempt to output too much reactive power from each of the plurality of inverters to regulate the voltage, causing each of the plurality of inverters to quickly reach maximum output reactive power capability. In addition, the control system can fight other utility voltage regulation devices, such as tap changing transformers, rendering the control system and the other voltage regulation devices ineffective.

Thus, a need exists for an improved system and method for regulating voltage at a point of interconnection of a renewable energy plant with a grid. A system and method that regulates voltage by controlling reactive power output without adversely interacting with other voltage regulation devices, such as tap changing transformers, shunt capacitors, etc., would be particularly useful.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a method for regulating the voltage at a point of interconnection of a renewable energy plant with a grid. The method includes receiving a voltage signal indicative of a voltage at the point of interconnection and filtering the voltage signal with a high pass filter to generate a filtered error signal. The method further includes generating a reactive power command for the renewable energy plant based at least in part from the filtered error signal and controlling one or more inverters of the renewable energy plant based on the reactive power command.

Another exemplary aspect of the present disclosure is directed to a control system for regulating a voltage at the point of interconnection between a renewable energy plant and a grid. The control system comprises a sensor providing a voltage signal indicative of a voltage at the point of interconnection and a high pass filter capable of receiving the voltage signal. The high pass filter is capable of generating a filtered error signal. The control system further includes a voltage regulator system configured to generate a reactive power command for the renewable energy plant based at least in part on the filtered error signal.

Another exemplary aspect of the present disclosure is directed to a control system for regulating the voltage at a point of interconnection between a renewable energy plant and a grid. The control system includes a voltage regulator configured to generate a reactive power command in response to a voltage variation at the point of interconnection. The reactive power command controls the reactive power output for one or more inverters in the renewable energy plant. The control system further includes a rejection module configured to reduce a response of the voltage regulator to a voltage shift caused by a voltage control device for the point of interconnection and a reset module configured to decrease over time the reactive power command generated in response to the voltage variation at the point of interconnection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
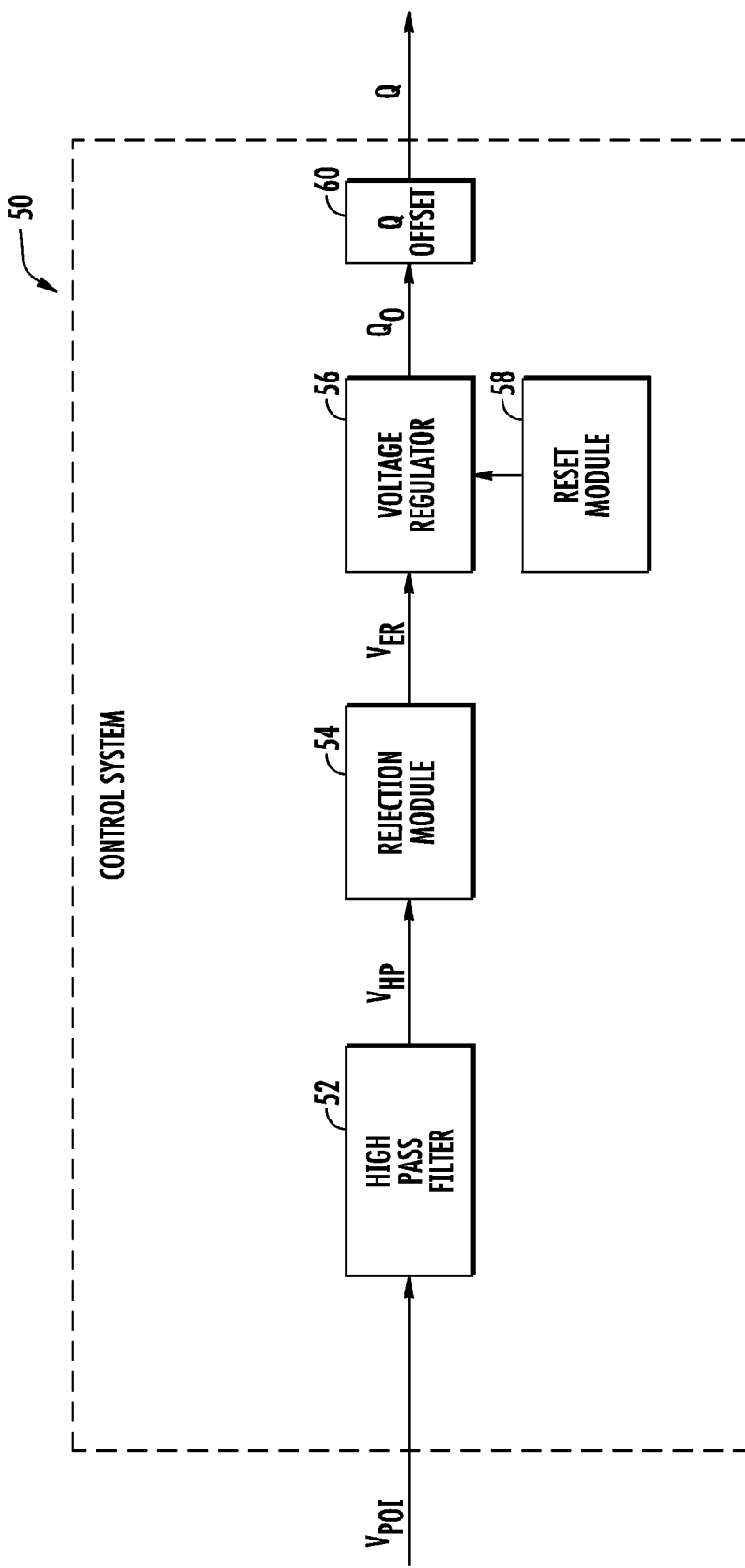
FIG. 1 depicts an overview of an exemplary control system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for regulating the voltage at a point of interconnection between a renewable energy plant, such as a solar farm, and a grid. The systems and methods can implement a control technique that has a technical effect of controlling the voltage only in response to fast voltage variations at the point of interconnection, such as voltage variations caused by changes in photovoltaic array (PV array) output in a partly cloudy day. The control techniques according to aspects of the present disclosure allow other voltage control devices, such as tap changing transformers or other voltage regulation devices, to control slow changing voltage variations at the point of interconnection.

FIG. 1 depicts an overview of a control system 50 for a renewable energy plant that controls the reactive power output of the renewable energy plant in response to voltage variations at a point of interconnection according to an exemplary embodiment of the present disclosure. The control system 50 can receive a voltage signal $V_{POI}$ indicative of the voltage at the point of interconnection and can regulate the voltage at the point of interconnection by generating a reactive power command Q for the renewable energy plant based on the voltage signal $V_{POI}$. The control system 50 can control one or more inverters based on the reactive power command Q to output reactive power to achieve a desired voltage at the point of interconnection.

According to aspects of the present disclosure, the control system 50 can include a high pass filter 52 configured to filter the voltage signal $V_{POI}$ and generate a filtered error signal $V_{HP}$. The high pass filter 52 can block voltage error components associated with voltage variations at a frequency less than a threshold frequency. In this way, the control system can prevent inverter response to slow changing events, such as daily load variation of a PV array in a solar farm. Other voltage control devices can control slow changing voltage events at the point of interconnection, such as components associated with voltage variations at a frequency less than the threshold frequency.

The control system 50 can further include a rejection module 54 that can be implemented such that the control system 50 does not respond to voltage shifts caused by the operation of the other voltage control devices for the renewable energy plant, such as tap changing transformers, shunt capacitors, or other suitable voltage control devices. In one embodiment, the rejection module 54 can be implemented, for instance, by incorporating a deadband into the control system. The deadband can block changes represented by the filtered error signal that are within a deadband range such that the control system does not have adverse interaction with other voltage control devices for the renewable energy plant.

In another embodiment, the rejection module 54 can be implemented by incorporating a feedback enable into the control system. The feedback enable can enable voltage regulation by the control system 50 based on both the voltage variation at the point of interconnection as well as the presence or absence of power variations at the point of interconnection. In particular, if the voltage and power variations at the point of interconnection are indicative of voltage variation caused by a voltage control device, such as a tap changing transformer, the feedback enable can reduce the response of the control system 50 to the voltage variation.

In yet another embodiment, the rejection module 54 can be implemented by making the high pass filter 52 a notch filter. The notch filter can still implement high pass filter functionality by blocking voltage error components associated with voltage variations at a frequency less than a threshold frequency, such as a first threshold frequency. In addition, the notch filter can block voltage error components associated with voltage variations at a frequency that is greater than a threshold frequency, such as greater than a second threshold frequency. The second threshold frequency can be set such that the filter blocks very high frequency content associated with voltage variations caused by a voltage control device, such as a tap changing transformer.

The rejection module 54 can provide a voltage error signal $V_{ER}$ to a voltage regulator 56. The voltage regulator 56 can generate a reactive power command $Q_0$ based on the voltage error signal $V_{ER}$. The control system can implement other modules to improve the regulation of the voltage at the point of interconnection of the renewable energy plant. For instance, the control system 50 can implement a reset module 58 that reduces the reactive power command $Q_0$ over time to allow the inverters of the renewable energy plant to preserve their dynamic reactive power output range. The control system can further implement a Q offset module 60 that allows a reactive power offset to be added to the reactive power command $Q_0$. The reactive power offset can allow the reactive power output of the renewable energy plant to be set to any initial value, such as at a fixed reactive power output specified by a system operator.

As used herein a module refers to circuitry utilized to provide desired functionality. A module can be implemented using control circuits, hardware, application specific circuits, firmware or other components. A module can also be implemented using instructions executed by a processing device.

The control techniques according to aspects of the present disclosure can provide numerous advantages. For instance, the inverters of the renewable energy plant can be prevented from maximizing reactive power output in response to voltage fluctuations that the inverters are not able to control. Adverse interaction between the reactive power output of the inverters and other voltage control devices can also be prevented, preventing excessive operation of the other voltage control devices due to the reactive power output of the inverters. Moreover, the voltage impacts of variable power generation, for instance from daily power output variation of PV arrays, can be reduced.

Figure 2:
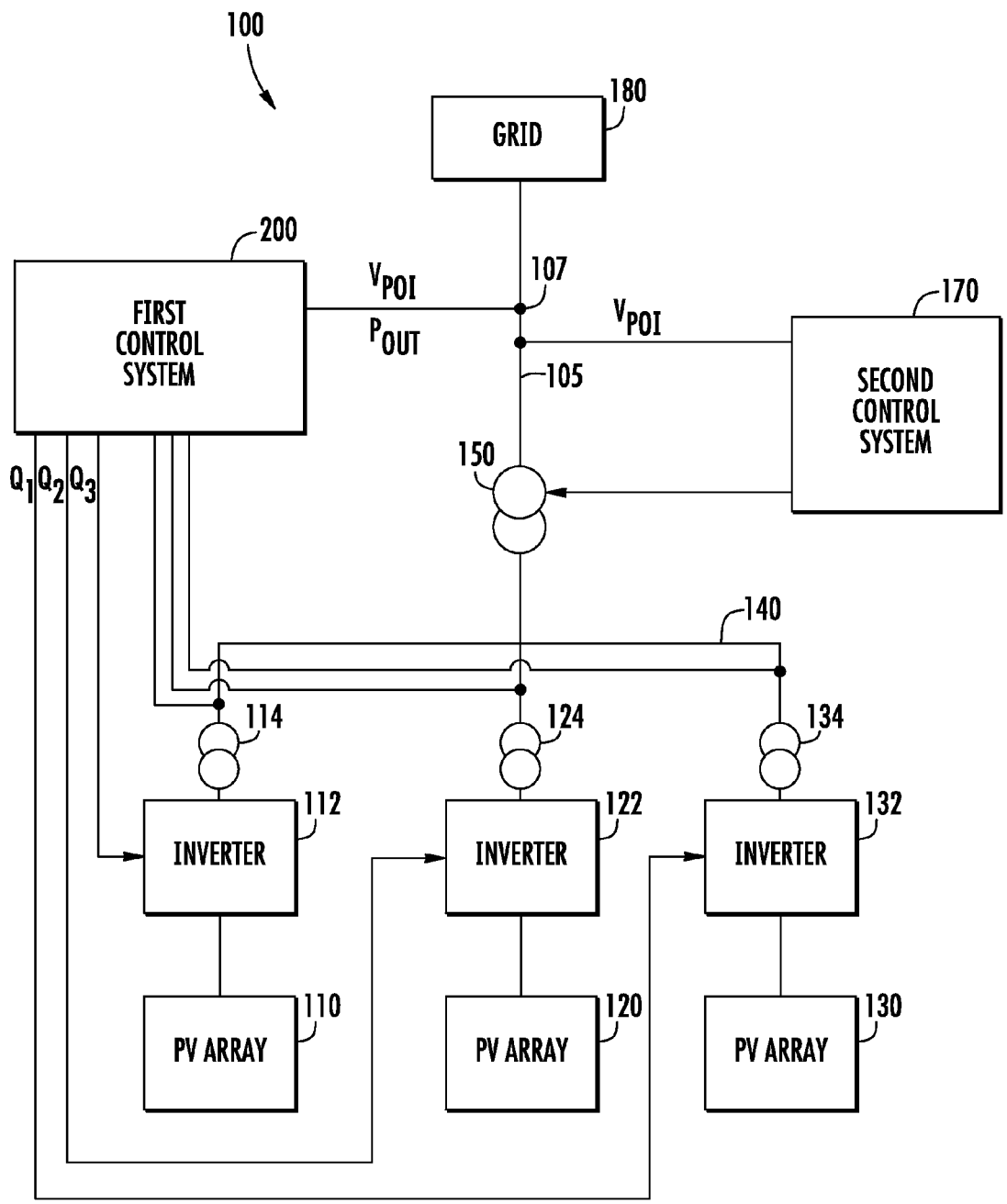
FIG. 2 depicts an exemplary renewable energy plant according to an exemplary embodiment of the present disclosure.

FIG. 2 depicts an exemplary renewable energy plant 100 according to an exemplary embodiment of the present disclosure. The renewable energy plant 100 depicted FIG. 2 is a solar farm. While the present disclosure will be discussed with reference to a solar farm for purposes of illustration and discussion, those of ordinary skill in the art, using the disclosures provided herein, will understand that the subject matter of the present disclosure is applicable to other renewable energy plants, such as wind farms and other renewable energy plants.

As shown, the renewable energy plant 100 includes a plurality of PV arrays 110, 120, and 130. Although three PV arrays are depicted in FIG. 2, more or less PV arrays can be included as part of the renewable energy plant 100 without deviating from the scope of the present disclosure. Each PV array 110, 120, and 130 can include a plurality of interconnected solar cells that produce DC power in response to solar energy incident on the PV array 110, 120 and 130.

Each PV array 110, 120, 130 is coupled to a respective inverter 112, 122, and 132. Each inverter 112, 122, and 132 can include one or more inverter bridge circuits that include switching devices, such as insulated gate bipolar transistors (IGBTs) or other switching devices, to convert DC power into AC power suitable for application to a grid 180. For instance, in certain embodiments, the inverters 112, 122, and 132 can used pulse width modulation (PWM) techniques to generate output AC power at the AC grid frequency (e.g. 60/50 Hz).

The output AC power provided by the inverters 112, 122, and 132 can have a real component and a reactive component. For instance, reactive power can be output by the inverters 112, 122, and 132 by generating an AC voltage and AC current that are out of phase. The amount of reactive power output by the inverters 112, 122, and 132 can be adjusted by adjusting the phase angle between the output AC voltage and AC current. According to aspects of the present disclosure, the reactive component output by the inverters 112, 122, and 132 can be controlled to regulate the voltage at a point of interconnection 105 between the renewable energy plant 100 and the grid.

Referring still to FIG. 2, each of the inverters 112, 122, and 132 can be coupled to a collector bus 140 through respective transformers 114, 124, and 134. The collector bus 140 can be tied to a grid 180 at a point of interconnection 105 through a main transformer 150. The grid 180 can include or be a part of a distribution system or a transmission system for a utility. According to particular aspects of the present disclosure, the main transformer 150 can be a tap changing transformer that can be used to regulate the voltage of the renewable energy plant 100 at the point of interconnection 105.

A first control system 200 can be provided for the renewable energy plant 100. The first control system 200 can monitor the voltage and/or the power at the point of interconnection 105 using various sensors, such as a voltage sensor 107 a current sensor, and/or other sensors. The first control system 200 can also monitor the real and reactive power outputs of the inverters 112, 122, and 132 using various voltage, current, and other sensors. The first control system 200 can be configured to regulate the voltage at the point of interconnection 105 by controlling the reactive power output of the inverters 112, 122, and 132.

In particular, the first control system 200 can determine reactive power commands $Q_1$, $Q_2$, and $Q_3$ for each of the inverters 112, 122, and 132 based on a voltage signal $V_{POI}$ indicative of the voltage at the point of interconnection 105 and/or a power signal $P_{OUT}$ indicative of the power at the point of interconnection 105. The power signal $P_{OUT}$ can be determined by monitoring the current at the point of interconnection 105 and deriving the power at the point of interconnection from the voltage and current measurements at the point of interconnection. The inverters 112, 122, and 132 can then control pulse width modulation of switching devices used as part of the inverters 112, 122, and 132 to provide an output AC power with a reactive power component in accordance with the reactive power commands. The reactive power output by the inverters 112, 122, and 132 will affect the reactive power provided at the point of interconnection 105, thereby influencing the voltage at the point of interconnection 105. Exemplary control topology for control system 200 will be discussed with reference to FIGS. 3 and 4 below.

As shown in FIG. 1, the renewable energy plant 100 can also include a second control system 170. The second control system 170 can control other voltage control devices, such as tap changing transformers, shunt capacitors, or other voltage control devices, to regulate the voltage at the point of interconnection 105. For instance, the second control system 170 can control the tap position of tap changing transformer 150 in response to voltage fluctuations at the point of interconnection 105. The second control system 170 can be operated by an operator of the renewable energy plant 100 or can be owned and/or operated by a utility. According to aspects of the present disclosure, the first control system 200 can be used to control fast voltage variations at the point of interconnection 105 while the second control system 170 can be used to control slow voltage variations at the point of interconnection 105.

Figure 3:
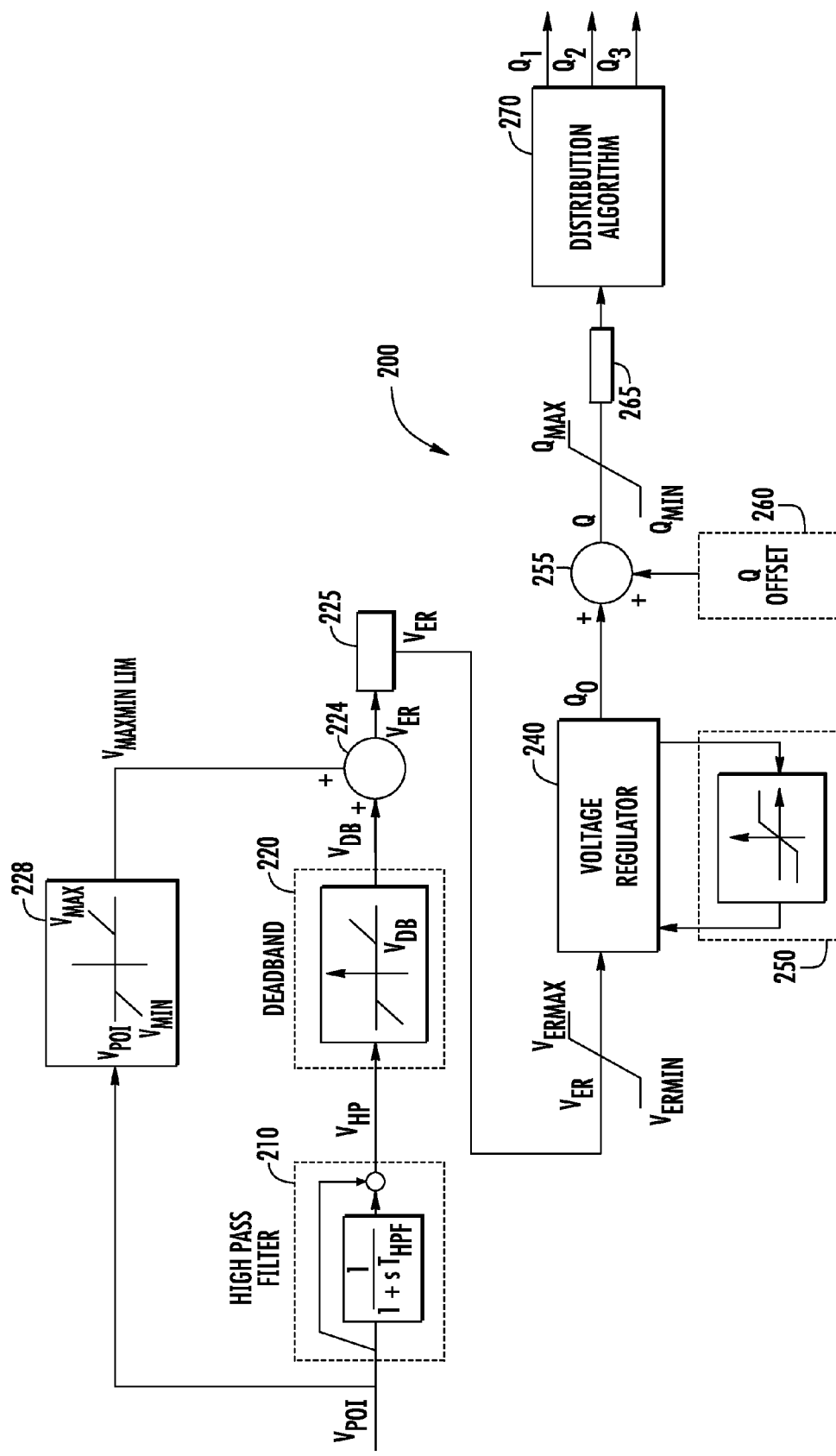
FIG. 3 depicts a control topology of an exemplary control system according to an exemplary embodiment of the present disclosure.

FIG. 3 depicts an exemplary control topology for the first control system 200 according to an exemplary embodiment of the present disclosure. The control system 200 can be implemented using a variety of control devices. In one embodiment, the control system 200, including any modules, nodes, regulators, and other components of the control system 200, can be implemented using a processor executing instructions stored in a computer readable medium. However, other suitable control devices, such as controllers, comparators, regulators, and the like, can be used to implement the control system 200. In a particular embodiment, the control system 200 can be implemented using application specific circuits or other suitable circuits design to provide the control functionality discussed herein.

The control system 200 can receive, for instance from a sensor, a voltage signal $V_{POI}$ indicative of a voltage at the point of interconnection for a renewable energy plant and can provide the voltage signal $V_{POI}$ to a high pass filter 210. The high pass filter 210 can be configured to block components of the voltage signal $V_{POI}$ that are associated with voltage variations at a frequency below a threshold frequency, as determined by the value of a high pass filter time constant $T_{HPF}$, to generate a filtered error signal $V_{HP}$. The time constant $T_{HPF}$ can be set to any value, but is preferably selected such that the control system 200 prevents inverter response to slow changing events resulting from, for instance, daily load variation of PV arrays. Other voltage control devices can be used to control slow changing voltage events, such as voltage events associated with a frequency less than the threshold frequency.

The control system 200 can include a voltage regulator system configured to generate a reactive power command Q based on the filtered error signal $V_{HP}$. As will be discussed in detail below, the voltage regulator system can include a variety of control devices, including voltage regulators, limiter devices, summing junctions, filters, deadband nodes, feedback enable nodes, reset device and other control devices or modules used to generate a reactive power command based on the filtered error signal $V_{HP}$. The voltage regulator system can implement various modules, such as a rejection module, a reset module, and other modules to improve performance of the control system 200. For example, the control system 200 can implement a rejection module to reduce the response of the control system 200 to voltage shifts caused by the operation of the other voltage control devices for the renewable energy plant, such as tap changing transformers, shunt capacitors, or other suitable voltage control devices.

In one embodiment, the rejection module can be implemented by the high pass filter 210. In particular, the high pass filter 210 can be a notch filter. The notch filter can still implement high pass filter functionality by blocking components associated with voltage variations at a frequency less than a threshold frequency, such as a first threshold frequency. In addition, the notch filter can block components associated with voltage variations at a frequency that is greater than a threshold frequency, such as greater than a second threshold frequency. The second threshold frequency can be set such that the filter blocks very high frequency content associated with voltage variations caused by a voltage control device, such as a tap changing transformer. In this manner, the high pass filter 210 can reduce the response of the control system 200 to voltage shifts caused by the operation of other voltage control devices.

In the exemplary control system 200 depicted in FIG. 3, the rejection module is implemented by a deadband node 220. In particular, the filtered error signal $V_{HP}$ can be provided to the deadband node 220. The deadband node 220 can have a deadband range. The deadband node 220 can be configured to provide a deadband error signal $V_{DB}$ based on the deadband range. For instance, the deadband node 220 can be configured to provide a zero error signal as the deadband voltage signal $V_{DB}$ when the filtered error signal $V_{HP}$ is within the deadband range. The deadband node 220 can be configured to provide the filtered error signal $V_{HP}$ as the deadband error signal $V_{DB}$ when the filtered error signal $V_{HP}$ is outside the deadband range.

The deadband range can be set to any suitable value. In one implementation, the deadband range is set based on the typical voltage movements caused by other voltage control devices for the point of interconnection of the renewable energy plant. For instance, if a tap changing transformer is configured to implement 1% changes in voltage at a time, the deadband range can be set such that the control system 200 only addresses changes in voltage that exceed 1%. In this manner, the control system 200 can avoid adverse interaction with other voltage regulation devices.

The deadband error signal $V_{DB}$ can be provided to a summing node 224 which receives a $V_{MAXMIN\ LIM}$ signal from a $V_{POI}$ limiter 228 and generates a voltage error signal $V_{ER}$. The $V_{MAXMIN\ LIM}$ signal is combined with the deadband error signal $V_{DB}$ to ensure that the voltage error signal $V_{ER}$ is within appropriate limits to prevent regulator windup, for instance, by control devices (e.g. integrators) in the voltage regulator 240. The voltage error signal $V_{ER}$ can then be provided to a filter 225 that can condition the voltage error signal $V_{ER}$ based on voltage measurement lag times. Voltage error signal $V_{ER}$ can be limited by a high side voltage error limiter and a low side voltage error limiter such that $V_{ER}$ is always between $V_{ERMAX}$ and $V_{ERMIN}$.

The voltage error signal $V_{ER}$ can be provided to voltage regulator 240 which generates a reactive power command $Q_0$ for the renewable energy plant based on the voltage error signal $V_{ER}$. The voltage regulator 240 can be a proportional integral regulator, a proportional derivative regulator, a proportional integral derivative regulator, or any other suitable regulator device capable of generating a reactive power command $Q_0$ based on the voltage error signal $V_{ER}$. Gains of the voltage regulator, such as a proportional gain and an integral gain, can be set to meet control performance objectives.

According to a particular aspect of the present disclosure, a reset 250 can be implemented in conjunction with the voltage regulator 240. The reset 250 can slowly reduce the reactive power command $Q_0$ over time to preserve the dynamic range of the inverters. For instance, if an event occurs which causes a spike in voltage at the point of interconnection, the control system 200 can generate a reactive power command $Q_0$ to respond to the event. A significant voltage event can cause the inverters to max out their reactive power output capability, reducing the ability of the inverters to dynamically respond to fast changing voltage variations. The reset 250 can slowly reduce the reactive power command $Q_0$ over time, for instance at a constant rate, so that the dynamic range of the reactive output power capability of the inverters can be preserved. The reactive power command $Q_0$ can be reduced in a linear or a non-linear manner depending on desired performance parameters.

According to another particular aspect of the present disclosure, a Q offset 260 can be added to the reactive power command $Q_0$ at a summing node 255 to generate a total reactive power command Q. The Q offset 260 can be used to implement Q initial functionality that allows the reactive power output of the renewable energy plant to be set to any initial value, such as at a fixed reactive power output specified by a system operator.

The total reactive power command Q can be limited by a high side reactive power limiter and a low side reactive power limiter such that the total reactive power command Q is always between $Q_{MAX}$ and $Q_{MIN}$. The total reactive power command Q can be provided to a filter 265 that can condition the total reactive power command Q based on cycling time, communication delay, and other filtering in the control. The total reactive power command Q can then be provided to a distribution algorithm 270 which determines individual inverter reactive power commands $Q_1$, $Q_2$, $Q_3$, etc. for inverters in the renewable energy plant. The distribution algorithm 270 can allocate reactive power among one or more the one or more inverters according to any suitable distribution scheme, such as to reduce losses in the renewable energy plant. The inverters can provide reactive power in accordance with inverter reactive power commands $Q_1$, $Q_2$, $Q_3$, etc. to control the voltage at the point of interconnection of the renewable energy plant with the grid.

Figure 4:
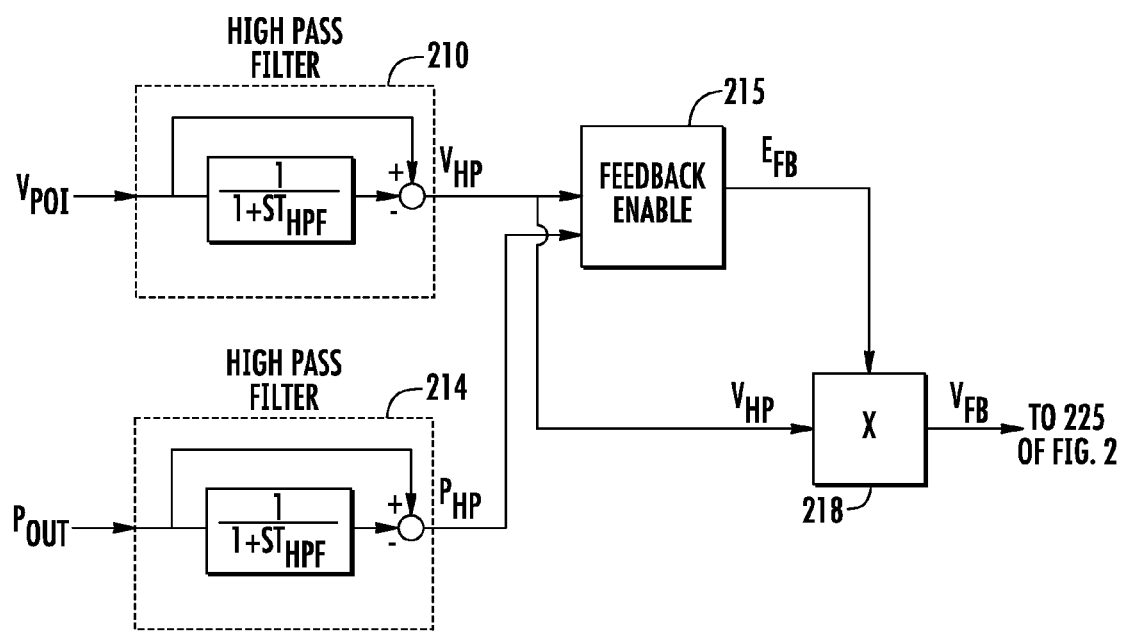
FIG. 4 depicts a control topology of an exemplary control system according to another exemplary embodiment of the present disclosure.

FIG. 4 depicts a variation of the exemplary control system 200 of FIG. 3 according to an exemplary embodiment of the present disclosure. Similar to the control system 200 of FIG. 3, a voltage signal $V_{POI}$ indicative of a voltage at the point of interconnection for a renewable energy plant can be provided to a high pass filter 210. The high pass filter 210 can be configured to block components of the voltage signal $V_{POI}$ that are associated with voltage variations at a frequency below a threshold frequency, as determined by the value of a time constant $T_{HPF}$, to generate a filtered error signal $V_{HP}$.

A power signal $P_{OUT}$ indicative of the power at the point of interconnection can also be received. The power signal $P_{OUT}$ can be determined, for instance, from voltage and current measurements performed by sensors at the point of interconnection. Similar to the voltage signal $V_{POI}$, the power signal $P_{OUT}$ is provided to a high pass filter 214. The high pass filter 214 can be configured to block components of the power signal that are associated with power variations at a frequency below a threshold frequency, as determined by the value of a time constant $T_{HPF}$, to generate a filtered power signal $P_{HP}$.

Instead of using a deadband node, a feedback enable node 215 can be used to implement the rejection module. More particularly, the filtered error signal $V_{HP}$ and the filtered power signal $P_{HP}$ can be provided to a feedback enable node 215. The feedback enable node 215 can be configured to generate a feedback enable signal $E_{FB}$ based at least in part on the filtered error signal $V_{HP}$ and the filtered power signal $P_{HP}$. In particular, the feedback enable node 215 can generate an enabling feedback enable signal $E_{FB}$ (e.g. a 1 output) when both the filtered error signal $V_{HP}$ and the filtered power signal $P_{HP}$ indicate movement in the same direction. In all other instances, the feedback enable node 215 can send a disabling feedback enable signal $E_{FB}$ (e.g. a 0 output) to reduce voltage regulator response to the voltage variations at the point of interconnection. The filtered error signal $V_{HP}$ can be multiplied by feedback enable signal $E_{FB}$ at node 218 to generate the voltage error signal $V_{ER}$. The voltage error signal $V_{ER}$ can then be provided to conditioning devices 225 and to a voltage regulator 240 for generating a reactive power command as discussed with reference to FIG. 3 above.

The feedback enable node 215 can reduce voltage regulator response to voltage shifts at the point of interconnection caused by other voltage control devices. In particular, the feedback enable node 215 enables voltage regulation according to aspects of the present disclosure if the voltage and power at the point of interconnection are moving in the same direction. Voltage variations under these circumstances are generally attributable to voltage events that require a regulator response. However, if the voltage and power at the point of interconnection are not moving in the same direction (e.g. the voltage is varying but the power remains substantially constant), the feedback enable node 215 can disable voltage regulator response to the voltage variations. Voltage variations under such circumstances are likely voltage shifts caused by other voltage control devices, such as a tap changing transformer or other voltage control device.

Figure 5:
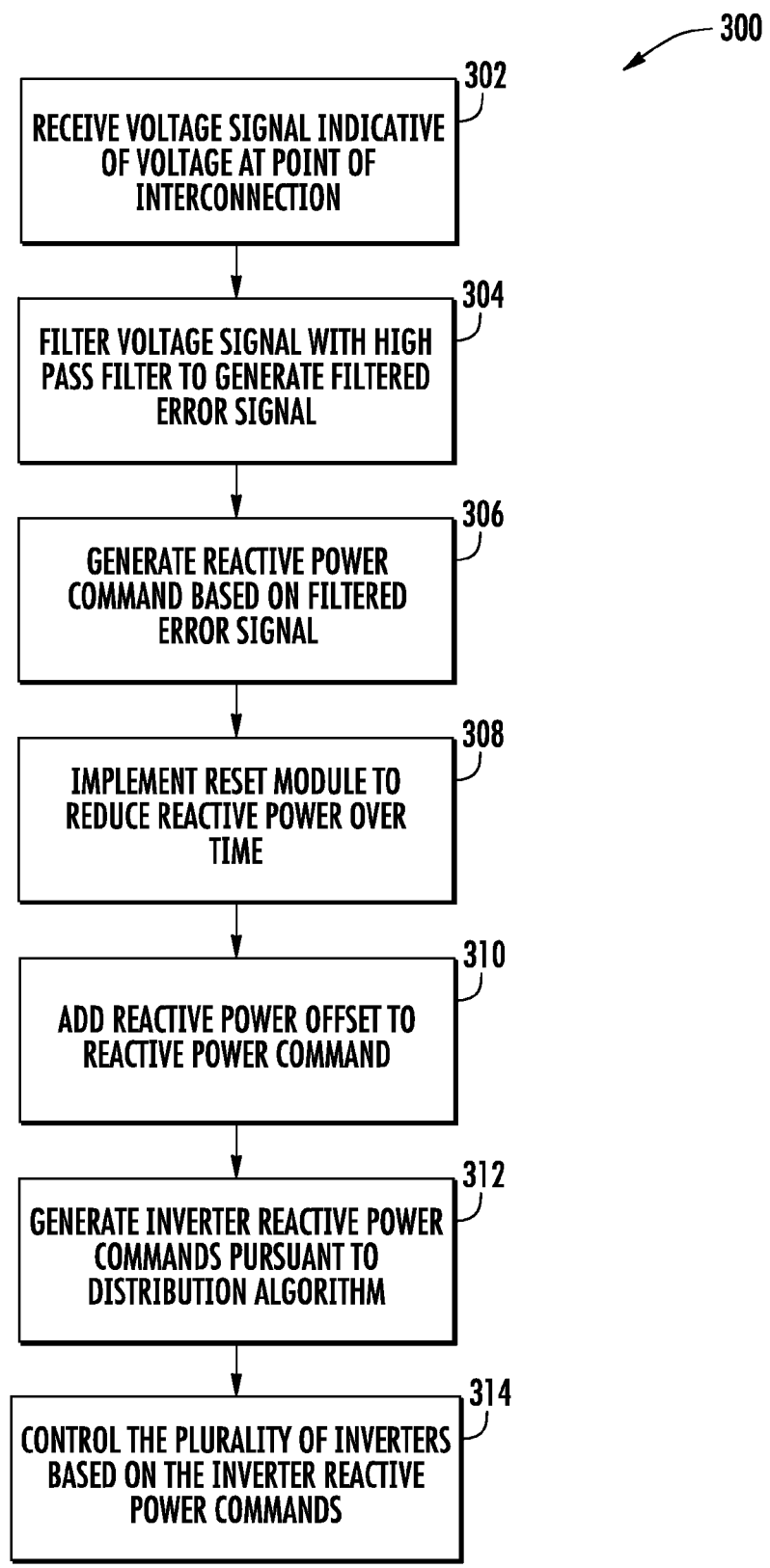
FIG. 5 depicts a flow chart of an exemplary method according to an exemplary embodiment of the present disclosure.

FIG. 5 depicts a flow chart of an exemplary method (300) for regulating the voltage at a point of interconnection of a renewable energy plant with a grid according to an exemplary embodiment of the present disclosure. The method of FIG. 5 can be implemented using any suitable control system, such as the control system 200 of FIG. 3. In addition, although FIG. 5 depicts steps performed in a particular order for purposes of illustration and discussion, those of ordinary skill in the art, using the disclosures provided herein, will understand that various steps of the methods can be omitted, rearranged, combined and/or adapted in various ways.

At (302), a voltage signal indicative of a voltage at a point of interconnection of renewable energy plant is received. For instance, a voltage signal $V_{POI}$ can be received at a control system 200 from a sensor monitoring the voltage at a point of interconnection 105 of the renewable energy plant 100. The voltage signal is filtered with a high pass filter to generate a filtered error signal at (304). For example, the high pass filter 210 can filter the voltage signal $V_{POI}$ to block components of the voltage signal associated with voltage variations at a frequency that is less than a threshold frequency to generate a filtered error signal $V_{HP}$.

At (306), a reactive power command can be generated based at least in part on the filtered error signal. For example, the control system 200 can generate a reactive power command Q for the renewable energy plant 100 based on the filtered error signal $V_{HP}$. For example, a voltage error signal can be generated based at least in part on the filtered error signal. A reactive power command for the renewable energy plant can then be generated, for instance by a voltage regulator, based on the voltage error signal.

In one embodiment, the voltage error signal can be generated by providing the filtered error signal to a deadband node having a deadband range. The deadband node provides the voltage error signal based on the deadband range. For instance, the voltage error can be a zero voltage error signal when the filtered error signal is within the deadband range and can be the filtered error signal when the filtered error signal is outside the deadband range.

In another embodiment, the voltage error signal can be generated based on a feedback enable signal. For instance, a feedback enable signal can be generated based on a filtered power signal associated with the power at the point of interconnection and the filtered error signal. The voltage error signal can be generated based on the feedback enable signal as discussed above with reference to FIG. 4.

Referring back to FIG. 5, once the reactive power command has been determined based on the filtered error signal, a reset function can be implemented to reduce the reactive power command over time as shown at (308). For example, the reset 250 of FIG. 2 can slowly reduce the reactive power command Q generated by the voltage regulator 240 over time. In one example, the reactive power command can be reduced at a constant rate. The reset function allows the inverters to maintain their dynamic range.

Referring back to FIG. 5, the method can include adding a reactive power offset to the reactive power command. For instance, the summing node 255 can add a Q offset to the reactive power command Q to generate a total reactive power command $Q_T$. The value of Q offset can be set by an operator such that the renewable energy plant provides at least a minimum reactive power output.

At (312), the method includes generating inverter reactive power commands pursuant to a distribution algorithm. For example, the total reactive power command $Q_T$ can be provided to a distribution algorithm 270 that determines inverter reactive power commands $Q_1$, $Q_2$, $Q_3$, etc. for individual inverters of the reactive power system. The distribution algorithm can assign reactive power to individual inverters in any suitable manner.

One or more of a plurality of inverters are controller based on the inverter reactive power commands at (314). For instance, inverters 112, 122, and 132 can be controlled pursuant to inverter reactive power commands $Q_1$, $Q_2$, and $Q_3$ to output a specific amount of reactive power. This can affect the total reactive power provided at a point of interconnection of a renewable energy plant and thus control the voltage at the point of interconnection of the renewable energy plant.

Figure 6:
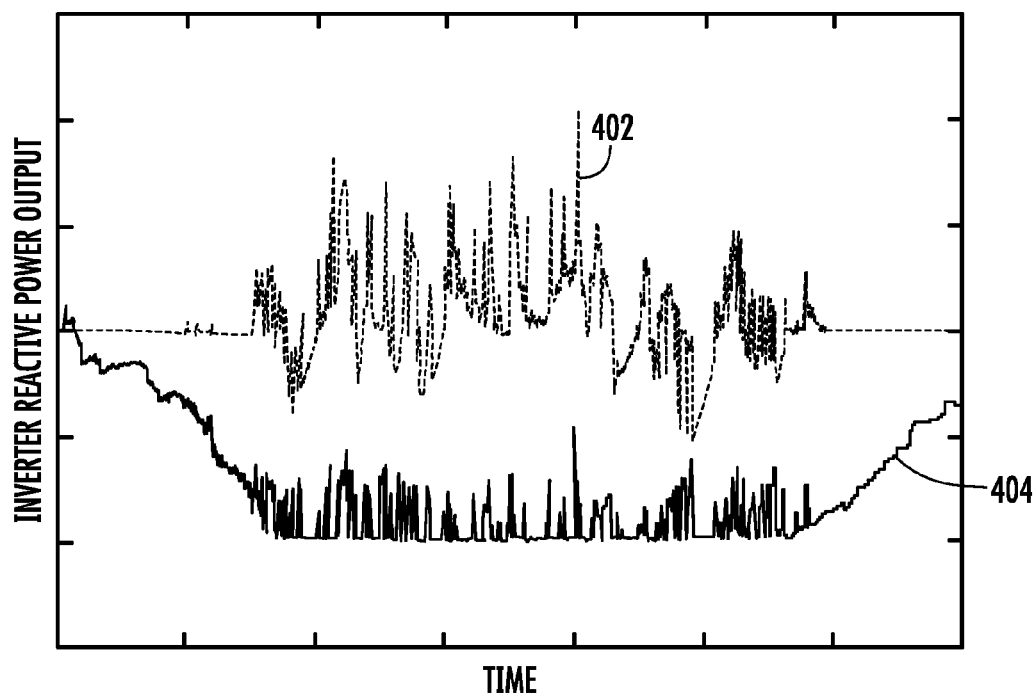
FIG. 6 provides a simulated graphical representation of the reactive power output of an inverter controlled according to known voltage regulation techniques and an inverter controlled according to an exemplary embodiment of the present disclosure.

To better appreciate the advantages of the systems and methods of regulating voltage at a point of interconnection of a renewable energy plant according to exemplary aspects of the present disclosure, the simulation results of an exemplary application of the disclosed techniques will now be presented. FIG. 6 provides a simulated graphical representation of the reactive power output of inverters over time. Curve 402 represents the reactive power output of an inverter controlled according to exemplary aspects of the present disclosure. Curve 404 represents the reactive power output of an inverter controlled according to existing control techniques. As shown by curve 404, in certain cases, the reactive power capability of the inverter can be depleted quickly such that the inverter loses voltage regulation capability. However, as shown by curve 402, the inverter controlled according to aspects of the present disclosure can preserve its dynamic range and maintain its voltage regulation capability.

Figure 7:
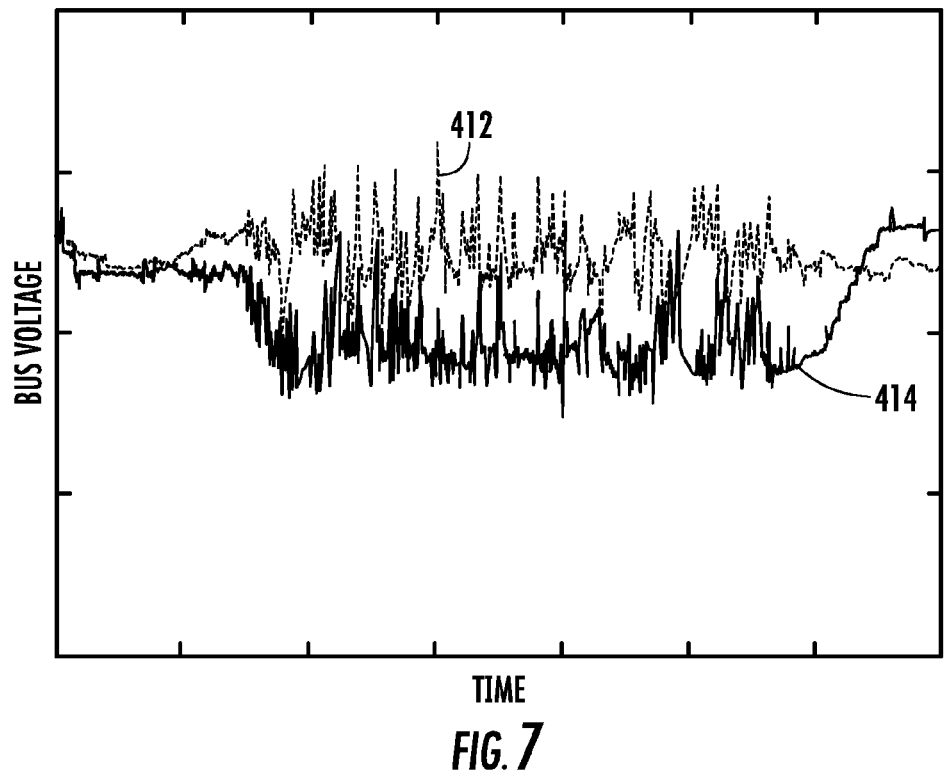
FIG. 7 provides a simulated graphical representation of the voltage at a point of interconnection for a renewable energy plant controlled according to known voltage regulation techniques and a renewable energy plant controlled according to an exemplary embodiment of the present disclosure.

FIG. 7 provides a simulated graphical representation of the voltage at a point of interconnection for a renewable energy plant over time. Curve 412 represents the voltage at the point of interconnection for a renewable energy plant controlled according to aspects of the present disclosure. Curve 414 represents the voltage at the point of interconnection for a renewable energy plant controlled according to existing control techniques.

Figure 8:
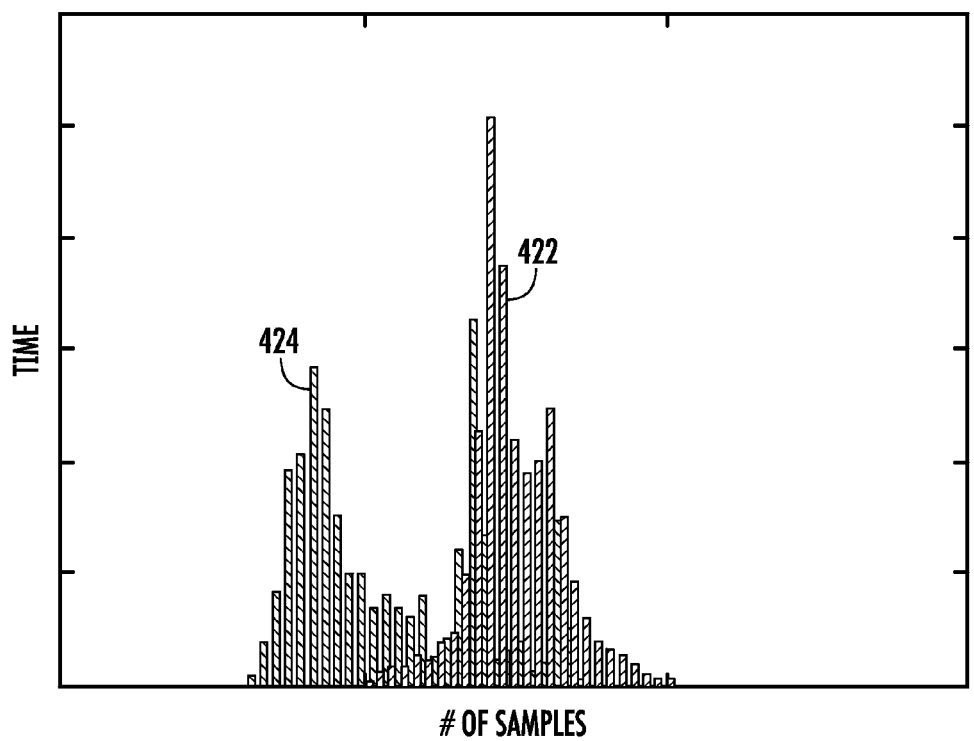
FIG. 8 provides a histogram of the voltages depicted in FIG. 7.

FIG. 8 provides a histogram of the voltages of FIG. 7. In particular, curve 422 provides a histogram of the voltage represented by curve 412 of FIG. 7. Curve 424 provides a histogram of the voltage represented by curve 414 of FIG. 7. As shown in FIG. 8, the renewable energy plant controlled according to aspects of the present disclosure has improved voltage performance relative to a renewable energy plant controlled according to existing control techniques.

Figure 9:
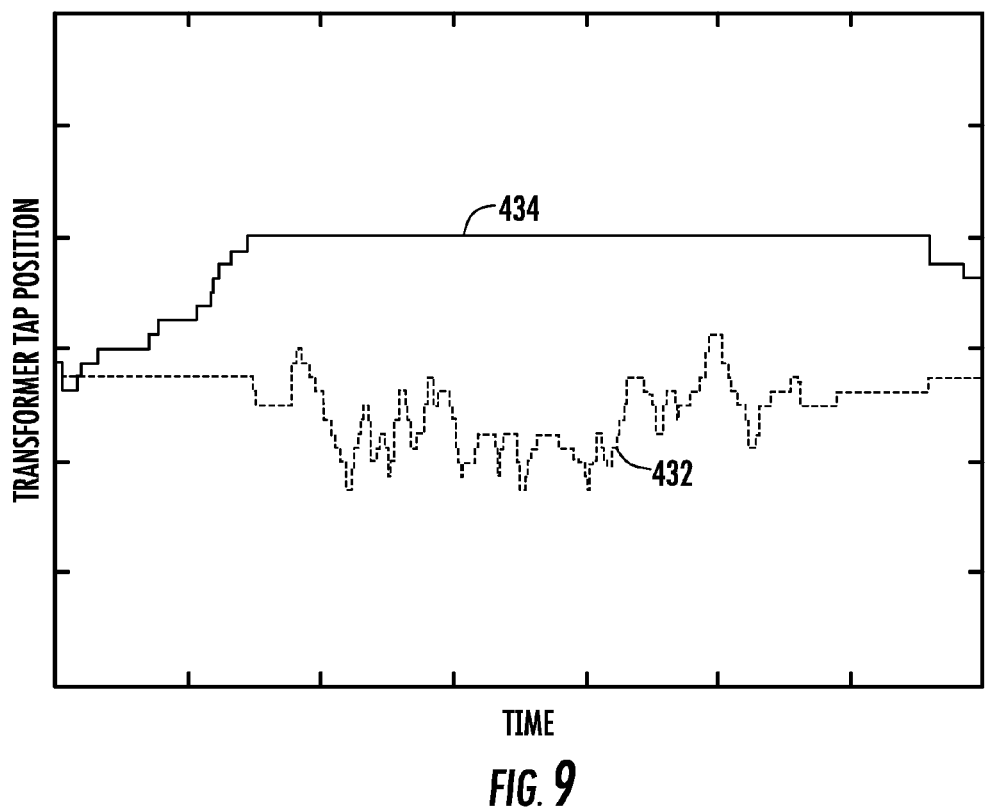
FIG. 9 provides a simulated graphical representation of a transformer tap position of a tap changing transformer for a renewable energy plant controlled according to known voltage regulation techniques and a renewable energy plant controlled according to an exemplary embodiment of the present disclosure.

FIG. 9 provides a simulated graphical representation of a transformer tap position of a tap changing transformer. Curve 432 represents the tap position of a tap changing transformer of a renewable energy plant controlled according to exemplary aspects of the present disclosure. Curve 434 represents the tap position of a tap changing transformer of a renewable energy plant controlled according to existing control techniques. As demonstrated by curve 434, the tap changing transformer can interact adversely with the inverters and quickly reach tap limits. However, when controlled according to aspects of the present disclosure, the tap changing transformer is allowed to more freely adjust to compensate for changes in voltage at the point of interconnection as demonstrated by curve 432.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for regulating the voltage at a point of interconnection between an energy plant and a grid, the control system comprising:
   a voltage regulator configured to generate a reactive power command in response to a voltage variation at the point of interconnection, the reactive power command controlling the reactive power output for one or more inverters in the energy plant;
   a rejection module configured to reduce a response of the voltage regulator to a voltage shift caused by a voltage control device of a second control system, the voltage control device configured to control voltage variations occurring at a frequency less than a threshold frequency at the point of interconnection; and
   a reset module configured to decrease over time the reactive power command generated in response to the voltage variation at the point of interconnection to preserve the dynamic reactive power output range of the one or more inverters and allow the voltage control device to control voltage variations occurring at a frequency less than the threshold frequency at the point of interconnection.

2. The control system of claim 1, wherein the rejection module comprises a deadband node.

3. A method for regulating voltage at a point of interconnection of a renewable energy plant with a grid, the method comprising:
   regulating the voltage at the point of interconnection with a voltage control device configured to control voltage variations occurring at a frequency less than a threshold frequency;
   receiving a voltage signal indicative of the voltage at the point of interconnection;
   filtering the voltage signal with a high pass filter to generate a filtered error signal, the high pass filter configured to block voltage error components associated with voltage variations at a frequency that is less than the threshold frequency;
   generating a reactive power command for the renewable energy plant based at least in part from the filtered error signal;
   controlling one or more inverters of the renewable energy plant to output reactive power based on the reactive power command; and
   decreasing over time the reactive power command to preserve the dynamic reactive power output range of the one or more inverters and allow the voltage control device to control voltage variations occurring at a frequency less than the threshold frequency at the point of interconnection.

4. The method of claim 3, wherein the high pass filter is a notch filter configured to block voltage error components associated with voltage variations at the point of interconnection at a frequency less than a first threshold frequency and configured to block voltage error components associated with voltage variations at the point of interconnection at a frequency greater than a second threshold frequency.

5. The method of claim 3, wherein generating a reactive power command for the renewable energy plant based at least in part from the filtered error signal comprises:
   generating a voltage error signal based at least in part on the filtered error signal; and generating, with a voltage regulator, a reactive power command for the renewable energy plant based on the voltage error signal.

6. The method of claim 5, wherein generating the voltage error signal comprises providing the filtered error signal to a deadband node having a deadband range, the deadband node providing the voltage error signal based on the deadband range.

7. The method of claim 6, wherein the voltage error signal is a zero voltage error signal when the filtered error signal is within the deadband range and is the filtered error signal when the filtered error signal is outside the deadband range.

8. The method of claim 5, wherein the method further comprises
receiving a power signal indicative of a power at the point of interconnection; and
filtering the power signal with a high pass filter to generate a filtered power signal.

9. The method of claim 8, wherein generating the voltage error signal comprises:
generating a feedback enable signal based on the filtered power signal and the filtered error signal; and
generating the voltage error signal based on the feedback enable signal.

10. The method of claim 3, wherein the high pass filter is configured to block voltage error components associated with voltage variations at a frequency that is less than a threshold frequency.

11. The method of claim 3, wherein the method further comprises regulating the voltage at the point of interconnection with a voltage control device.

12. The method of claim 3, wherein the voltage control device comprises a tap changing transformer.

13. The method of claim 3, wherein the renewable energy plant is a solar farm.

14. A control system for regulating a voltage at the point of interconnection between a renewable energy plant and a grid, the control system comprising:

a sensor providing a voltage signal indicative of a voltage at the point of interconnection;
a high pass filter capable of receiving the voltage signal and generating a filtered error signal, the high pass filter configured to block voltage error components associated with voltage variations at a frequency that is less than a threshold frequency, the voltage error components associated with a voltage control device configured to control voltage variations occurring at a frequency less than a threshold frequency;
a voltage regulator system configured to generate a reactive power command for the renewable energy plant based at least in part on the filtered error signal; and
a reset module capable of reducing the reactive power command over time to preserve the dynamic reactive power output range of the renewable energy plant and allow the voltage control device to control voltage variations occurring at a frequency less than the threshold frequency at the point of interconnection.

15. The control system of claim 14, wherein the voltage regulator system is configured to generate a reactive power command by generating a voltage error signal based on the filtered error signal and generating the reactive power command based on the voltage error signal.

16. The control system of claim 15, wherein the voltage regulator system comprises a deadband node having a deadband range, the deadband node capable of receiving the filtered error signal and providing the voltage error signal based on the deadband range.

17. The control system of claim 15, wherein the voltage regulator system comprises a feedback enable node, the feedback enable node configured to generate a feedback enable signal based on a filtered power signal and the filtered error signal, the voltage regulator system configured to generate the voltage error signal based on the feedback enable signal.

* * * * *